United States Patent
Waldorf et al.

(10) Patent No.: US 7,854,456 B2
(45) Date of Patent: Dec. 21, 2010

(54) DUAL ROD GRIPPER

(75) Inventors: Conrad Earl Waldorf, Pinckney, MI (US); James R. Kalb, Petersburg, MI (US)

(73) Assignee: Syron Engineering and Manufacturing, LLC, Saline, MI (US)

( * ) Notice: Subject to any disclaimer, the term of this patent is extended or adjusted under 35 U.S.C. 154(b) by 626 days.

(21) Appl. No.: 11/734,839

(22) Filed: Apr. 13, 2007

(65) Prior Publication Data
US 2007/0241577 A1  Oct. 18, 2007

Related U.S. Application Data

(60) Provisional application No. 60/791,685, filed on Apr. 13, 2006.

(51) Int. Cl.
*B25J 15/08* (2006.01)
(52) U.S. Cl. .................................. 294/88; 294/116
(58) Field of Classification Search .................. 294/88, 294/115, 116; 269/32, 34; 901/37
See application file for complete search history.

(56) References Cited

U.S. PATENT DOCUMENTS

| | | | | |
|---|---|---|---|---|
| 2,850,926 A | * | 9/1958 | Jobe | 269/234 |
| 3,322,456 A | * | 5/1967 | Strakhal et al. | 294/88 |
| 3,630,391 A | * | 12/1971 | Wilson | 414/744.8 |
| 3,971,190 A | | 7/1976 | McGill | |
| 4,291,729 A | | 9/1981 | Steiner | |
| 4,529,182 A | | 7/1985 | Valentine | |
| 4,626,013 A | | 12/1986 | Barrows | |
| 4,723,806 A | * | 2/1988 | Yuda | 294/119.1 |
| 4,743,055 A | | 5/1988 | Dantan | |
| 5,152,568 A | | 10/1992 | Blatt | |
| 5,277,689 A | * | 1/1994 | Ruetschle et al. | 483/36 |
| 5,484,181 A | | 1/1996 | Saadat | |
| 5,826,811 A | | 10/1998 | Melbye et al. | |
| 5,947,539 A | | 9/1999 | Long et al. | |
| 6,056,281 A | * | 5/2000 | Moilanen et al. | 269/32 |
| 6,176,532 B1 | | 1/2001 | Degener | |
| 6,176,533 B1 | * | 1/2001 | Moilanen et al. | 294/88 |
| 6,309,003 B1 | | 10/2001 | Bertini | |
| 6,412,845 B1 | * | 7/2002 | Sawdon et al. | 294/88 |
| 6,477,442 B1 | | 11/2002 | Valerino, Sr. | |
| 6,530,615 B2 | | 3/2003 | Filipiak et al. | |
| 6,874,834 B2 | | 4/2005 | McIntosh et al. | |
| 2002/0093211 A1 | | 7/2002 | Filipiak et al. | |

FOREIGN PATENT DOCUMENTS

GB  2145690  4/1985

OTHER PUBLICATIONS

International Search Report and Written Opinion mailed on Sep. 25, 2007.

* cited by examiner

*Primary Examiner*—Dean J Kramer
(74) *Attorney, Agent, or Firm*—Young, Basile, Hanlon & MacFarlane, P.C.

(57) ABSTRACT

A gripper assembly has an extended position and a retracted position. The gripper assembly includes a first jaw and a second jaw that are each coupled for movement of a range of motion. The range of motion of each of the first jaw and the second jaw is independently adjustable from the range of motion of the other of the first jaw and the second jaw.

16 Claims, 9 Drawing Sheets

DUAL ROD GRIPPER

REFERENCE TO RELATED APPLICATIONS

This application claims priority to U.S. Provisional Patent Application No. 60/791,685 filed Apr. 13, 2006.

BACKGROUND OF THE INVENTION

This invention generally relates to automated handling equipment. More particularly, this invention relates to an actuated dual rod gripper device.

Automated handling equipment is typically employed in industrial settings for transferring work pieces between work stations. Typically, the equipment includes a fluid-actuated gripper that clamps the work pieces while moving them between the work stations.

Conventional fluid-actuated grippers include a fluid actuator, such as a pneumatic or hydraulic cylinder, that linearly reciprocates a piston. The piston is coupled to a cam pin that is received through cam slots of two opposed gripper jaws. Each gripper jaw is pivotable about a pivot pin that extends into side walls that extend from the fluid actuator. As the piston reciprocates, the cam pin slides along the cam slots to selectively pivot the jaws about the pivot pins between an open jaw position and a closed jaw position.

The jaws of typical fluid-actuated grippers are removable and replaceable with different jaws to accommodate work pieces of varying shapes and sizes. For example, jaws having different cam slot lengths and shapes (i.e., slot angles) may be substituted to change the size of the opening between the jaws. The cam slot length and shape defines the open position of the jaws. Alternatively, stops are used to limit the opening of the jaws.

Although conventional grippers are effective for clamping and transferring work pieces or other objects, using replaceable jaws to change the size of the jaw opening adds complexity and is time consuming. Furthermore, replaceable jaws only allow incremental adjustment of the jaw opening that correspond to the cam slot angles and do not provide for intermediate jaw opening sizes. Additionally, jaws that are not in use must be stored and may become lost.

Accordingly, there is a need for a gripper assembly that allows adjustment of a jaw opening without the use of replaceable jaws.

SUMMARY OF THE INVENTION

A gripper assembly includes an actuator that controls the opening and closing of gripper jaws. A piston includes openings that each receive a first rod and a second rod. A forward portion of each rod receives a cam pin to move the gripper jaws.

When the gripper assembly is in a retracted position, ends of the rods are not axially offset. A first sleeve of the first rod is spaced from the piston, and a second sleeve of the second rod is flush with the piston. As the piston moves forward to open the jaws, the second sleeve is pushed forward to extend the second rod to open the associated jaw. Once the piston contacts the first flange, the first rod extends to open the associated jaw.

When the gripper assembly is in the extended position, the ends of the rods are axially offset. A first nut on the opposite end of the first rod is spaced from the piston, and a second nut on the opposite end of the second rod is flush with the piston. As the piston moves rearward to close the jaws, the second nut is pushed rearward to retract the second rod to close the associated jaw. Once the piston contacts the first nut, the first rod retracts to close the associated jaw.

In another example, the openings in the piston each accommodate sub-pistons axially movable within the openings. A bracket secured to a front of the gripper assembly includes elongated cavities that receive ends of the respective rods. Each cavity has an associated threaded stop screw. A slot extends through each cavity, and the cam pins that move the gripper jaws extend through the slots.

The stop screws control the stroke of the rods. The second stop screw extends further into the second cavity than the first stop screw extends into the first cavity. As the rods simultaneously extend forward, the second rod contacts the second stop screw before the first rod contacts the first stop screw. Thus, the first rod has a longer stroke than the second rod.

When moving into an extended position to open the jaws, the second rod and the second sub-piston stop moving when the second rod contacts the second stop screw. The piston and the first rod continue to move forward until the first rod contacts the first stop screw. When moving into a retracted position to close the jaws, the piston retracts towards the rear surface. The piston first engages the first sub-piston on the first rod to retract the first rod. The piston then engages the second sub-piston on the second rod to retract the second rod. This provides synchronous retraction of the rods to close the jaws.

DETAILED DESCRIPTION OF THE PREFERRED EMBODIMENT

Figure 1:
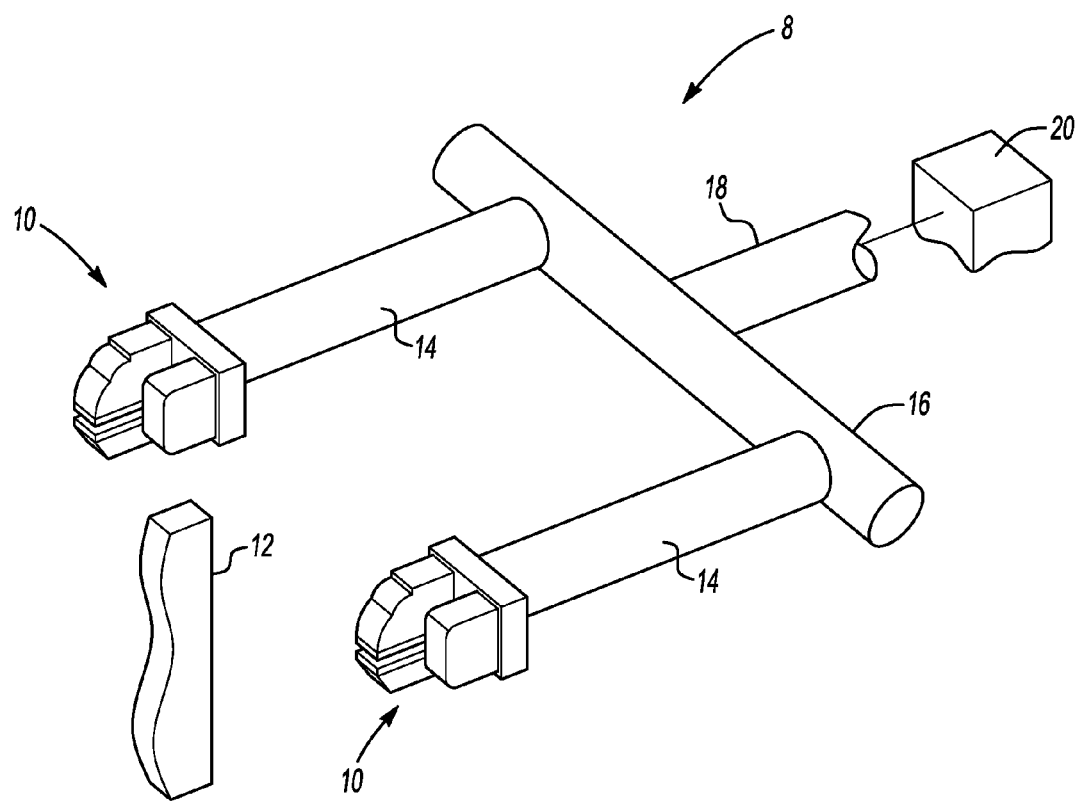
FIG. 1 illustrates gripper assemblies for moving work pieces between work stations.

FIG. 1 illustrates selected portions of several gripper assemblies 10 used in an example industrial setting 8 to grip and move a work piece 12 (shown schematically). The gripper assemblies 10 may be used in a variety of different configurations from that shown. In this example, the gripper assemblies 10 are coupled to extended arms 14, which are each secured to a rail 16. An adapter arm 18 is secured to the rail 16. An automated machine 20, such as a robot, moves the adapter arm 18, the extended arms 14, and the gripper assemblies 10 to desired positions to retrieve and deposit the work pieces 12, such as between work stations.

Figure 2:
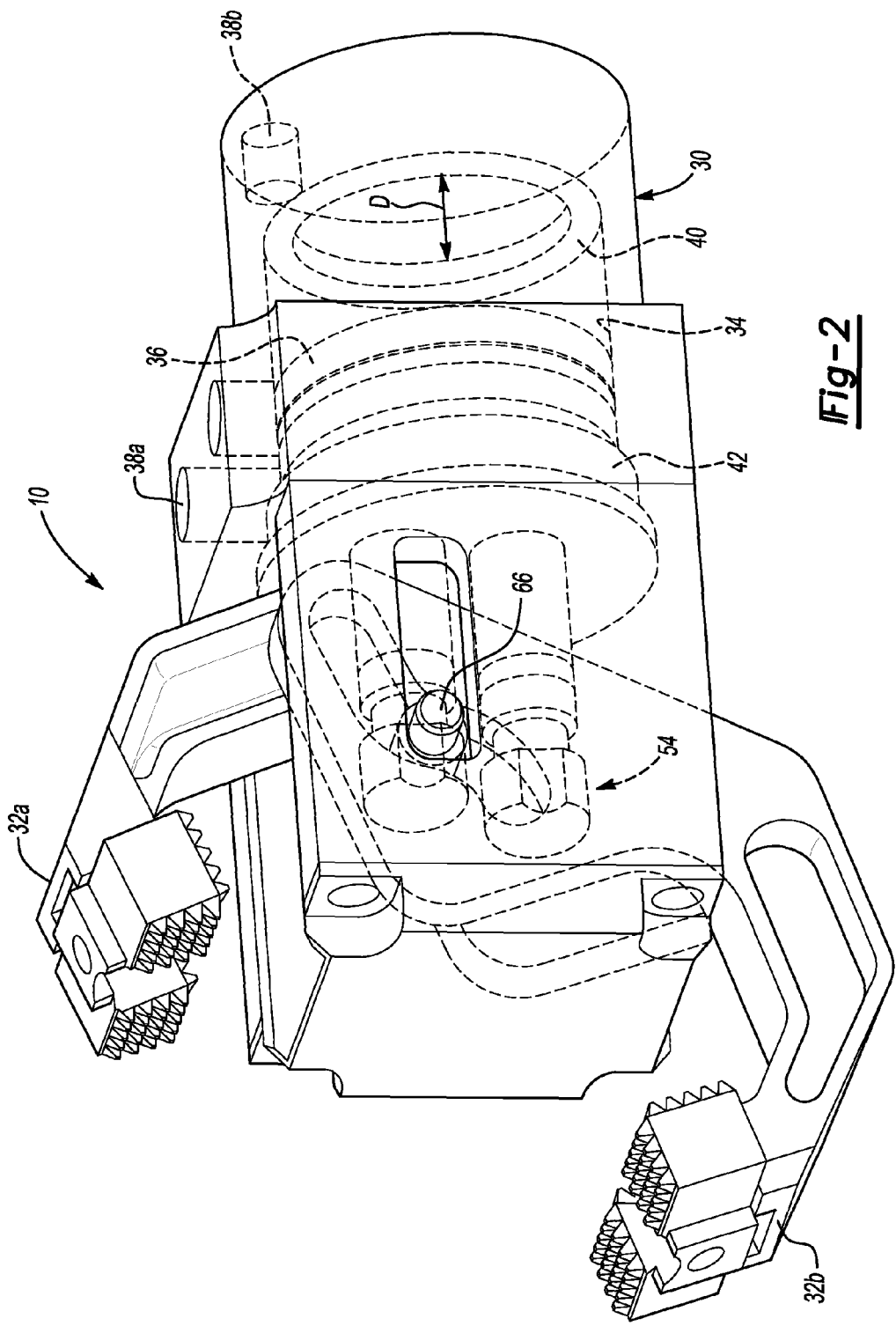
FIG. 2 illustrates a perspective view of a gripper assembly in an extended position.
Figure 3:
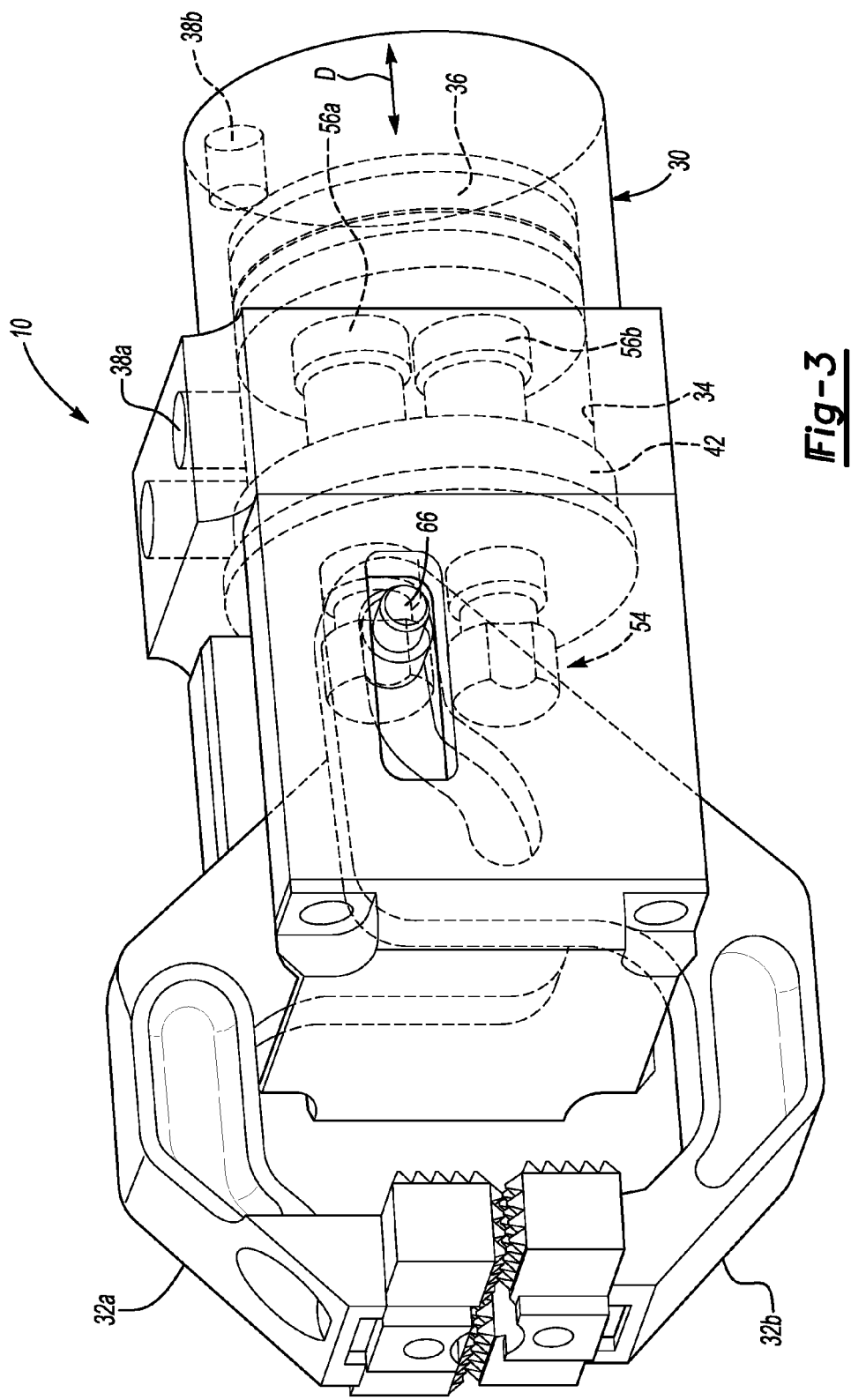
FIG. 3 illustrates a perspective view of the gripper assembly in a retracted position.
Figure 4:
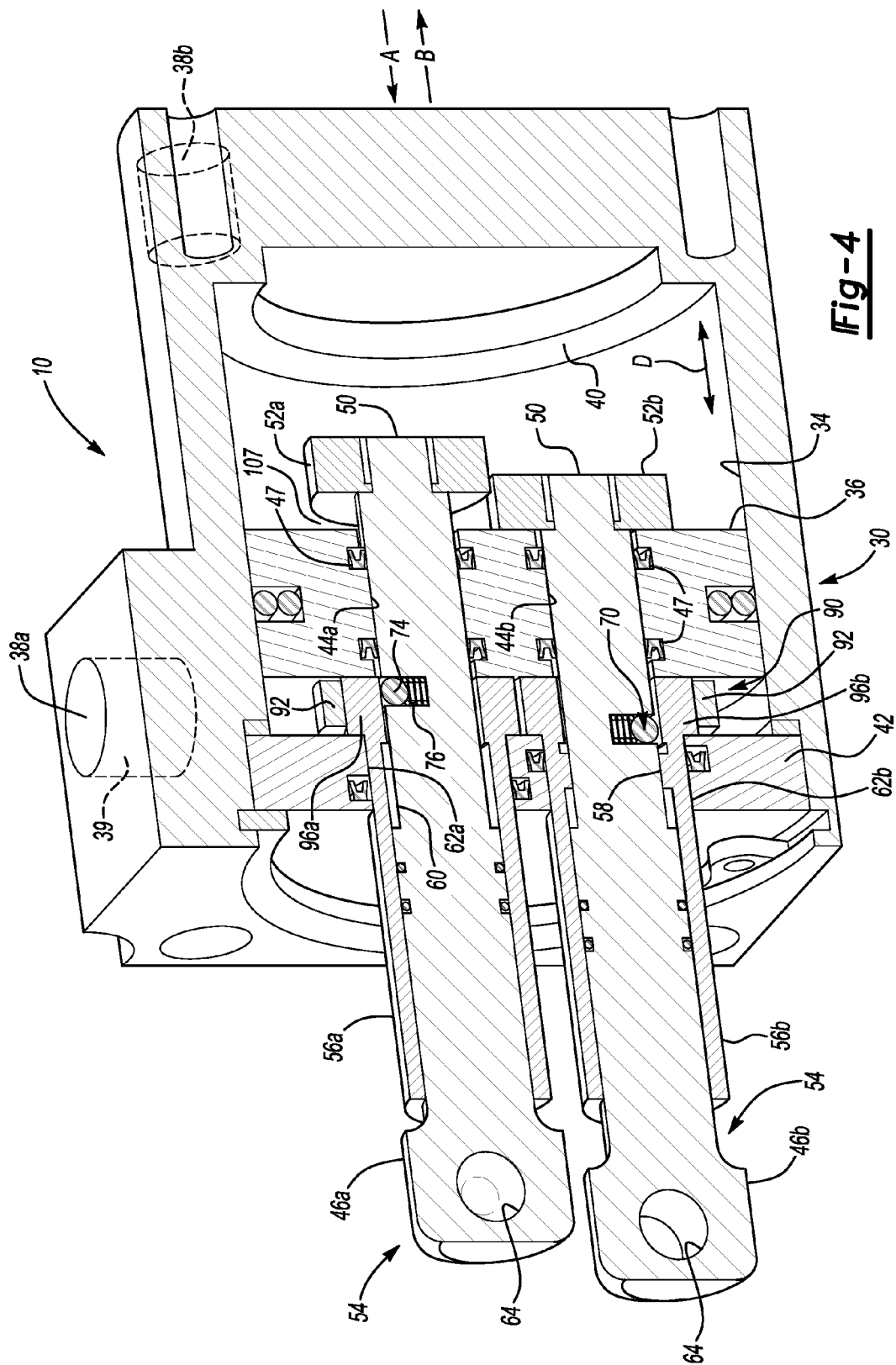
FIG. 4 illustrates a cross-sectional view of the gripper assembly in an extended position.
Figure 5:
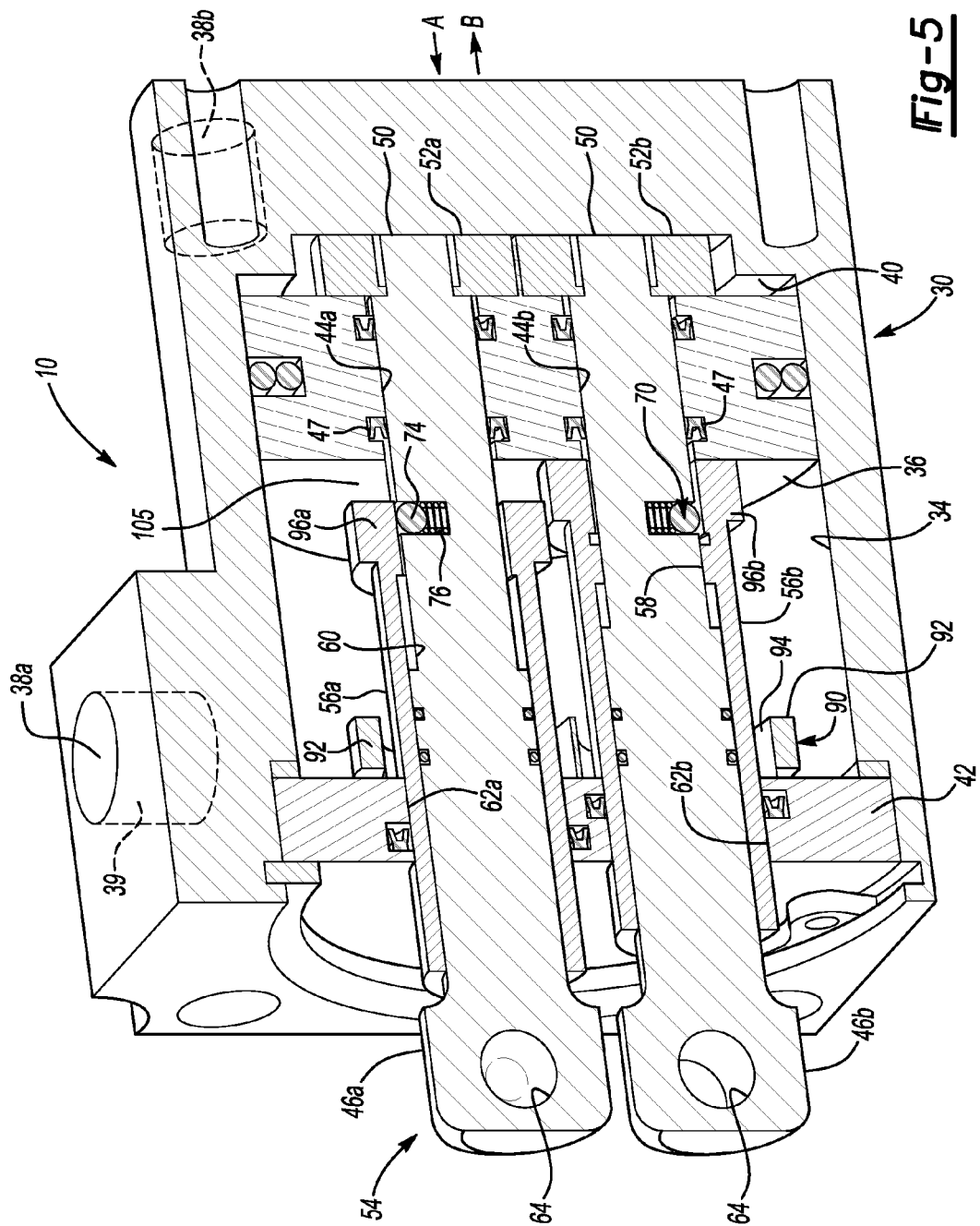
FIG. 5 illustrates a cross-sectional view of the gripper assembly in a retracted position.

FIGS. 2 and 3 illustrate selected portions of the gripper assembly 10 in an extended position and a retracted position, respectively. FIGS. 4 and 5 illustrate a cross-section of the gripper assembly 10 in the extended position and the retracted position, respectively. In this example, the gripper assembly 10 includes an actuator 30, such as a pneumatic or hydraulic actuator. The actuator 30 selectively controls the opening and closing of the gripper jaws 32a and 32b. When the gripper assembly 10 is in the retracted position, the jaws 32a and 32b are closed. When the gripper assembly 10 is in the extended position, the jaws 32a and 32b are open. In one example, the gripper assembly 10 can include two separate actuators 30 each including a piston 36 that each move a gripper jaw 32a and 32b. For example, the two actuators 30 can operate independently from each other such that they do not operate in synchrony.

In one example, the actuator 30 is cylindrical and includes a central bore 34 that contains a piston 36. The central bore 34 is in communication with ports 38a and 38b through which an actuating fluid is provided to move the piston 36 axially along a direction D within the central bore 34 between the extended position and the retracted position. The port 38a selectively provides fluid through a passage 39 to move the piston 36 in one direction, and the port 38b selectively provides fluid to move the piston 36 in the other direction. The piston 36 is movable between a rear surface 40 of the actuator 30 and a cap 42.

The piston 36 includes a first opening 44a and a second opening 44b that each extend through a thickness of the piston 36. The first opening 44a slidingly receives a first rod 46a, and the second opening 44b slidingly receives a second rod 46b. O-rings actuate fluid from flowing through the openings 44a and 44b in the piston 36. In other examples, seal rings, U-cups, or other types of seals may be used.

Each of the rods 46a and 46b includes a rearward threaded rear portion 50 that receives a threaded nut 52a and 52b, respectively. Forward portions 54 of each of the rods 46a and 46b receive a sleeve 56a and 56b, respectively, that includes a threaded portion 58 that engages a corresponding threaded portion 60 on each of the rods 46a and 46b. The rods 46a and 46b and the sleeves 56a and 56b extend through respective openings 62a and 62b in the cap 42. The relative position between the sleeves 56a and 56b and the rods 46a and 46b controls the stroke of the rods 46a and 46b. The forward portions 54 of each of the rods 46a and 46b also includes an opening 64 that receives a cam pin 66 to move the jaws 32a and 32b in a known manner.

Each of the rods 46a and 46b includes a positioning member 70 that facilitates relative positioning between the sleeve 56a and 56b and the rods 46a and 46b, respectively. The relative position between the sleeves 56a and 56b and the rods 46a and 46b, respectively, is adjustable to adjust the stroke of each of the rods 46a and 46b. Rotating the sleeves 56a and 56b with respect to either of the rods 46a or 46b, respectively, adjusts the relative axial position between the sleeve 56a and 56b and the rod 46a or 46b, respectively, (i.e., axial movement from the threaded portions 58 and 60).

Figure 6:
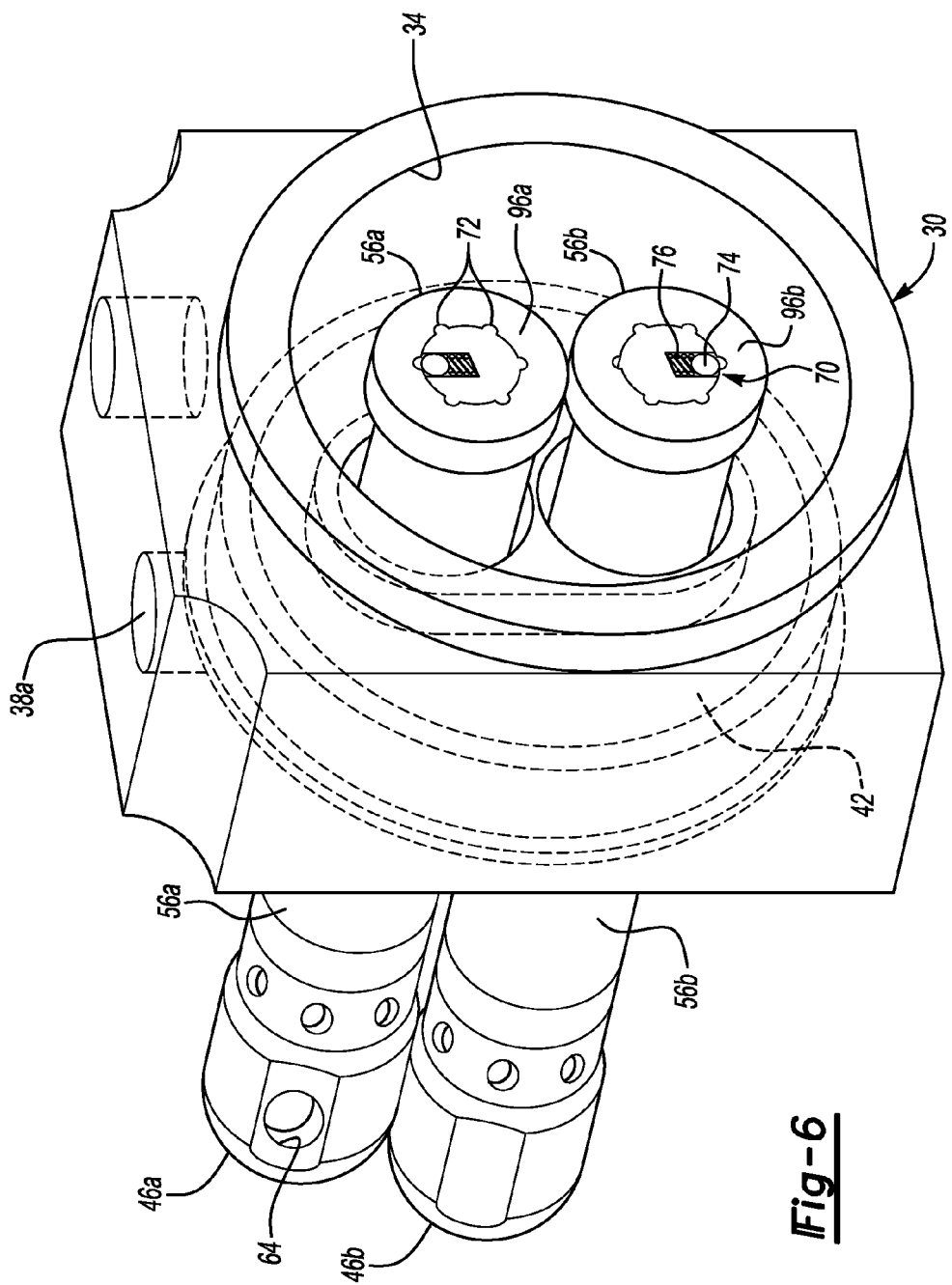
FIG. 6 illustrates a section view of a cylinder of the gripper assembly.

As shown in FIG. 6, an inner circumferential diameter of a flange 96a and 96b of rear portions of each of the sleeves 56a and 56b, respectively, has spaced apart detents 72. The detents 72 have a shape that corresponds to the positioning member 70. The positioning member 70 includes a ball 74 and a spring 76. The spring 76 exerts a force on the ball 74 that biases the ball 74 in a radially outward direction relative to the rod 46a or 46b. As the sleeve 56a and 56b is rotated relative to the rod 46a or 46b, respectively, the spring 76 pushes the ball 74 into one of the detents 72. In one example, the detents 72 have a radius of a curvature that is similar to a radius of curvature of the ball 74. The engagement between the ball 74 and the detent 72 locks or resists rotation between the sleeve 56a and 56b and the rod 46a or 46b, respectively. If further adjustment between the sleeve 56a and 56b and the rod 46a or 46b, respectively, is desired, a higher amount of rotational force is applied to the sleeve 56a and 56b to slide the ball 74 out of the detent 72. The positioning member 70 locks the sleeve 56a and 56b relative to the rod 46a or 46b, respectively. Thus, the relative position will not change during operation of the gripper assembly 10 due to slippage, vibration, or other forces.

In FIGS. 2 and 4, the gripper assembly 10 is in an extended position, and the jaws 32a and 32b are open. The rods 46a and 46b are in a non-synchronous position. That is, the ends of the rods 46a and 46b are axially offset from each other. The nut 52a on the rod 46a is spaced apart from the piston 36 by a gap 107, and the nut 52b on the rod 46b is flush with the piston 36. As the piston 36 retracts toward the rear surface 40 in a direction B, the piston 36 contacts the nut 52b on the rod 46b to retract the rod 46b. The nut 52a on the rod 46a is spaced apart from the piston 36 by the gap 107, so the piston 36 initially does not retract the rod 46a. Once the piston 36 moves enough to eliminate the gap 107, the piston 36 begins to retract the rod 46a, providing synchronous retraction of the rods 46a and 46b. Retraction of the piston 36 closes the jaws 32a and 32b. Thus, simultaneous retraction of the rods 46a and 46b provides the benefit of synchronous closing of the jaws 32a and 32b during the later portion of the retraction, which is when the jaws 32a and 32b exert a relatively high clamping force. Synchronous clamping is desired to apply an evenly distributed force on the work piece 12.

FIGS. 3 and 5 illustrate selected portions of the gripper assembly 10 in the retracted position, and the jaws 32a and 32b are closed. The rods 46a and 46b are in a synchronous position. That is, the ends of the rods 46a and 46b are not axially offset from each other. There is a gap 105 between the flange 96a of the sleeve 56a of the rod 46a and the piston 36, and the flange 96b of the sleeve 56b of the rod 46b is flush with the piston 36. As the piston 36 moves forward in a direction A to open the jaws 32a and 32b, the sleeve 56b on the rod 46b is pushed forward by the piston 36 to extend the rod 46b. Because the flange 96a of the rod 46a is spaced from the piston 36 by the gap 105, the piston 36 initially does not extend the rod 46a. Once the piston 36 moves enough to eliminate the gap 105, the piston 36 contacts the flange 96a of the sleeve 56a and also extends the rod 46a.

The sleeves 56a and 56b are independently axially adjustable relative to each of the rods 46a and 46b to control the size of the gaps 105 and 107. This controls the stroke of the rods 46a and 46b, which in turn controls the amount that the respective jaw 32a or 32b opens. Adjusting the sleeve 56a and 56b to increase the gaps 105 and 107 provides a shorter stroke that corresponds to a smaller jaw 32a or 32b opening. Adjusting the sleeve 56a and 56b to decrease the gaps 105 and 107 provides a longer stroke that corresponds to a larger jaw 32a or 32b opening. This allows a user to tailor how wide the jaws 32a and 32b open to provide a desired gripper assembly 10 profile with a desired clearance around the machinery (e.g., dies, presses, etc.) in which the gripper assembly 10 operates. For example, the space within a press may be limited such that a small jaw 32a and 32b opening is desired to avoid interference with the press. Thus, the term "range of jaw motion" as used in this description refers to how wide the jaws 32a and 32b open. This can be determined or measured in any of a variety of known ways. In one example, a distance between the jaws 32a and 32b while in an open position defines the range of motion. In another example, an angle to which the jaws 32a and 32b pivot relative to a reference plane defines the range of motion.

The cap 42 includes a cushion 90 to reduce the impact between the sleeves 56a and 56b and the cap 42 when the piston 36 moves to the extended position. In the disclosed example, the cushion 90 is a fluid cushion. The cushion 90 includes a sleeve 92 that defines an annular space 94 that corresponds in size to the size of the flanges 96a and 96b. When the piston 36 moves the sleeves 56a and 56b to the extended position, the flanges 96 are received in the annular spaces 94. The sleeves 92 include an orifice (not shown) that extends through the thickness of the sleeves 92 such that when the flanges 96a and 96b enter the annular spaces 94, fluid (e.g., air) within the annular spaces 94 is pushed through the orifices. The orifices are sized such that they restrict the air flow out of the annular space 94 to resist movement of the flanges 96a and 96b into the annular spaces 94, cushioning the impact between the sleeves 56a and 56b and the cap 42.

Figure 7:
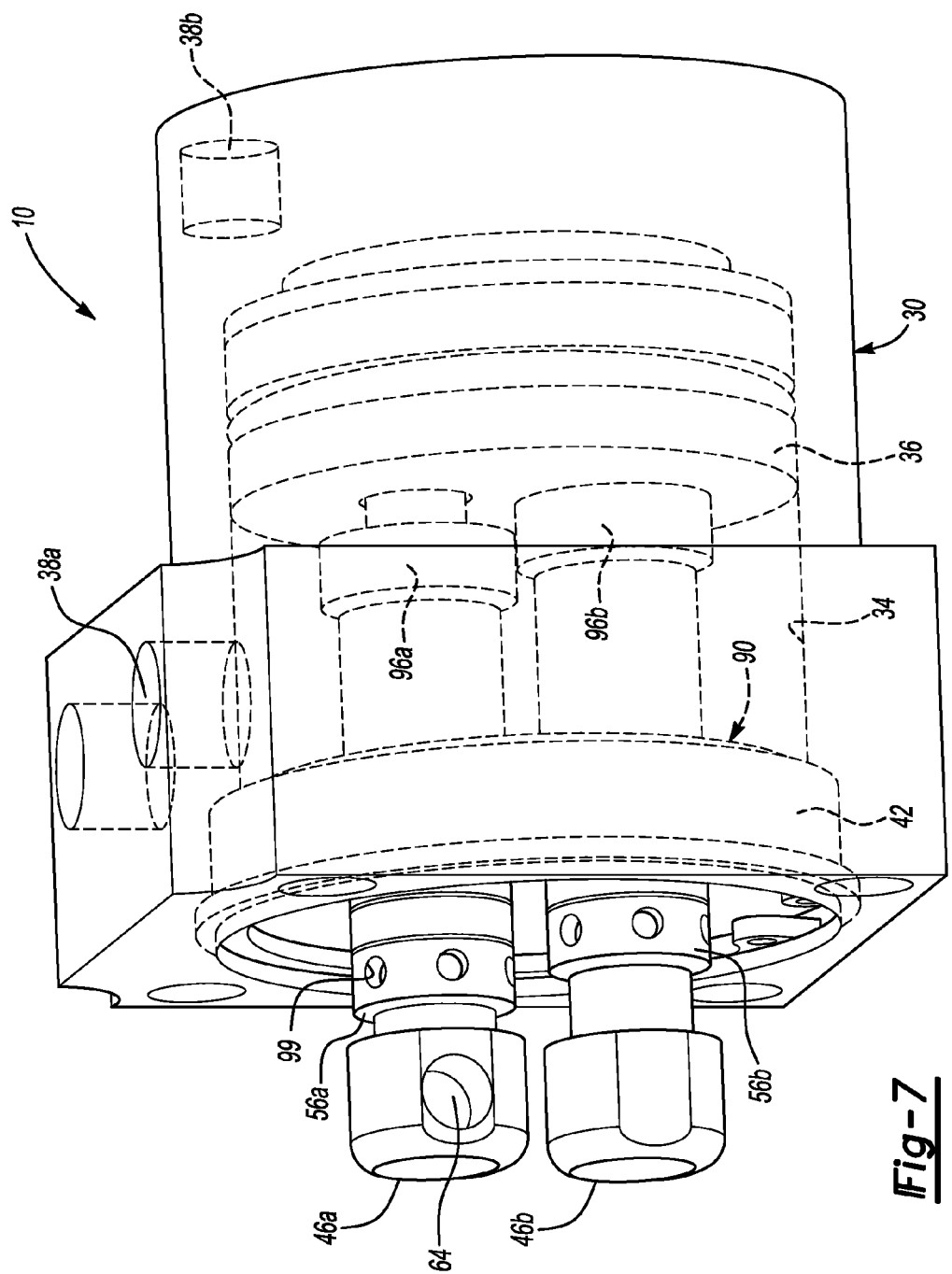
FIG. 7 illustrates another perspective view of the gripper assembly.

FIG. 7 illustrates a perspective view of selected portions of the gripper assembly 10. Each sleeve 56a and 56b includes a series of openings 99 spaced about a circumference of the sleeves 56a and 56b. The shape of the openings 99 corresponds to a shape of an adjustment tool for adjusting the position of the sleeves 56a and 56b. An operator can use a spanner wrench to engage the openings 99 to rotate the sleeves 56a and 56b to a desirable position. This allows the operator to easily adjust the position of the sleeves 56a and 56b to control the stroke of the rods 46a and 46b, respectively.

Figure 8:
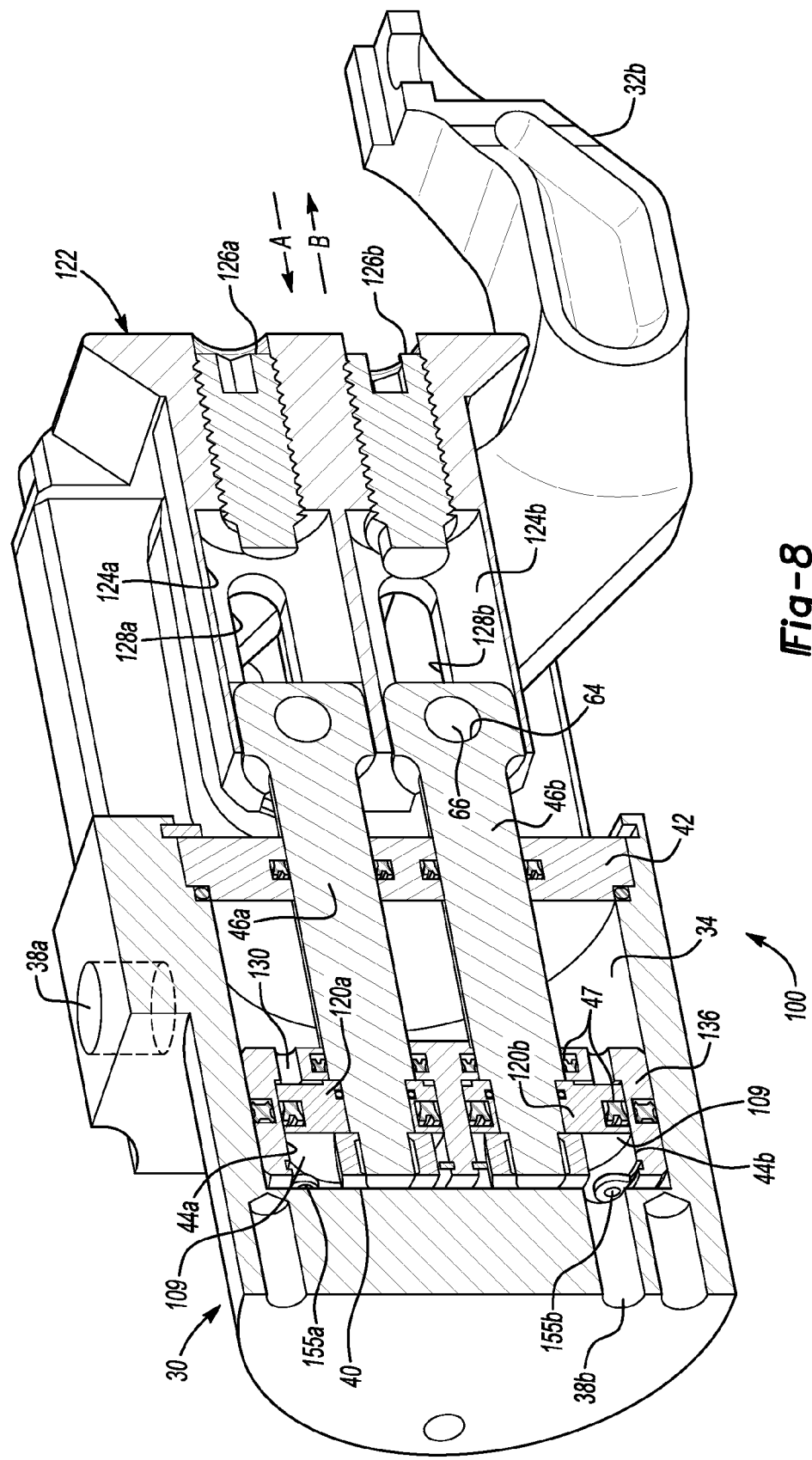
FIG. 8 illustrates a cross-sectional view of a second gripper assembly in a retracted position.
Figure 9:
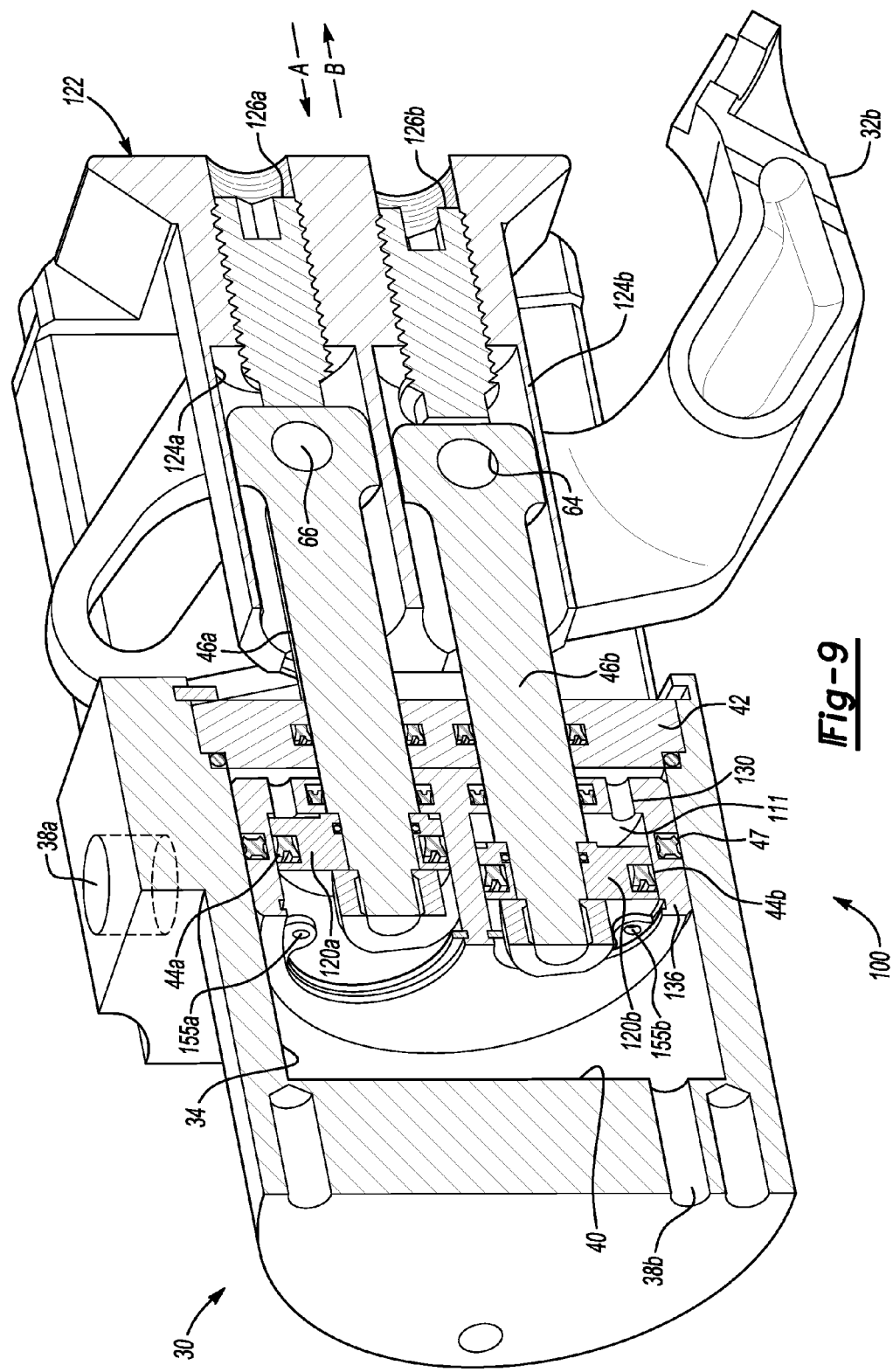
FIG. 9 illustrates a cross-sectional view of the second gripper assembly in an extended position.

FIGS. 8 and 9 illustrate a cross-sectional view of a second example gripper assembly 100 in a retracted position and an extended position, respectively. The gripper assembly 100 provides adjustment of the stroke of the rods 46a and 46b. The gripper assembly 100 is similar to the gripper assembly 10 previously described. However, the functions provided by the nuts 52a and 52b and the sleeves 56a and 56b of the previous example have been replaced with a different piston 136, sub-pistons 120a and 120b, and a bracket 122.

The sub-pistons 120a and 120b are secured to the respective rods 46a and 46b. The openings 44a and 44b in the piston 136 are sized to accommodate the sub-pistons 120a and 120b such that the sub-pistons 120a and 120b are axially movable within the openings 44a and 44b. O-rings 47 seal the sub-pistons 120a and 120b within the respective openings 44a and 44b.

The bracket 122 is secured to a front of the gripper assembly 100 in a known manner, such as with fasteners to side walls (not shown) that extend from the actuator 30. In one example, an alignment feature (not shown) aligns the bracket 122 and the actuator 30. The bracket 122 includes elongated cavities 124a and 124b that receive ends of the respective rods 46a and 46b, respectively. Each of the cavities 124a and 124b includes a stop screw 126a and 126b, respectively, that is threadingly engaged with a body of the bracket 122. A slot 128a and 128b extends from each cavity 124a and 124b through the bracket 122 body. The cam pins 66 extend through the slots 128a and 128b and move along the slots 128a and 128b when the rods 46a and 46b, respectively, move.

The stop screws 126a and 126b are independently adjustable to control the strokes of the rods 46a and 46b, respectively. In one example, the stop screw 126b is adjusted so that it extends farther into the cavity 124b than the stop screw 126a extends into the cavity 124a. As the rods 46a and 46b simultaneously extend forward, the rod 46b contacts the stop screw 126b before the rod 46a contacts the stop screw 126a. Thus, the rod 46a has a longer stroke than the rod 46b.

In the retracted position shown in FIG. 8, the rods 46a and 46b are not axially offset. The sub-pistons 120a and 120b are flush with the piston 136, defining a gap 109 between the sub-pistons 120a and 120b and a stop surface 155a and 155b, respectively, at a rear of the piston 136. When the piston 136 moves in the direction B from the retracted position to the extended position, fluid provided through the port 38b exerts pressure on the piston 136 and on each of the sub-pistons 120a and 120b. The pressure moves both the piston 136 and the sub-pistons 120a in the direction B to the extended position. The sub-pistons 120a and 120b are flush with the piston 136 during movement in the direction B. When the rod 46b contacts the stop screw 126b, the rod 46b and the sub-piston 120b stop moving. The movement of the piston 136 coupled with the stopping of the rod 46b and the sub-piston 120b eliminates the gap 109 between the sub-piston 120b and the stop surface 155b at the rear of the piston 136 and creates a gap 111 between the sub-piston 120b and a front of the piston 136. The fluid pressure continues moving the piston 136 and the rod 46a forward until the rod 46a contacts the stop screw 126a.

FIG. 9 shows the rods 46a and 46b in the extended position in which the rods 46a and 46b are axially offset. When moving to the retracted position, the piston 136 retracts in the direction A toward the rear surface 40. The piston 136 already contacts the sub-piston 120a on the rod 46a, causing the rod 46a to retract. Because the sub-piston 120b on the rod 46b is spaced apart from the piston 136 by the gap 111, the piston 136 initially does not retract the rod 46b. Once the piston 136 retracts enough to eliminate the gap 111, the piston 136 contacts the sub-piston 120b and begins to retract the rod 46b. This provides synchronous retraction of the rods 46a and 46b. Retraction of the piston 136 corresponds to closing of the jaws 32a and 32b. Simultaneous retraction of the rods 46a and 46b provides synchronous closing of the jaws 32a and 32b during the later portion of the retraction, which is when the jaws 32a and 32b exert a relatively high clamping force. Synchronous clamping is desired to apply an evenly distributed force on the work piece 12.

Optionally, the piston 136 includes passages 130 that allow fluid exchange between the openings 44a and 44b and the volume defined by the central bore 34 of the actuator 30. Allowing fluid to pass through the passage 130 prevents suction, or locking, between the sub-piston 120a and 120b and the piston 136 that might hinder movement of either of the rods 46a or 46b.

The gripper assemblies 10 and 100 provide the advantage of adjusting the stroke of the rods 46a and 46b to control the range of motion of the gripping jaws 32a and 32b. The detents 72 and the threading engagement between the sleeves 56a and 56b and the rods 46a and 46b enable a user to finely adjust to a desirable range of jaw motion. The range of motion can be adjusted without having to substitute different jaws and provides synchronous closing of the jaws 32a and 32b during the later portion of rod 46a and 46b retraction. In some examples, replacement jaws are not needed, which require storage space and are vulnerable to misplacement.

The preceding description is exemplary rather than limiting in nature. Variations and modifications to the disclosed example may become apparent to those skilled in the art that do not necessarily depart from the purview and spirit of this invention. The scope of legal protection given to this invention can only be determined by studying the following claims.

What is claimed is:

1. A gripper assembly, comprising:
 a piston moveable between an extended position and a retracted position;
 a first rod and a second rod each connected to the piston;
 a first jaw and a second jaw connected to the first rod and the second rod, respectively, for movement over a range of motion in response to movement of the piston, wherein the range of motion of each of the first jaw and the second jaw is independently adjustable from the range of motion of the other of the first jaw and the second jaw;

wherein the first jaw and the second jaw are in an open position when the piston is in the extended position and the first jaw and the second jaw are in a closed position when the piston is in the retracted position; and wherein the piston synchronously moves the first rod and the second rod when the first jaw and the second jaw are near the closed position and asynchronously moves the first rod and the second rod when the first jaw and the second jaw are near the open position during movement of the first jaw and the second jaw toward the closed position from the open position.

2. A gripper assembly comprising:

a piston moveable between an extended position and a retracted position; and a first jaw and a second jaw each coupled to the piston for movement over a range of motion, wherein the range of motion of each of the first jaw and the second jaw is independently adjustable from the range of motion of the other of the first jaw and the second jaw, wherein the piston includes a first opening that slidingly receives a first rod associated with the first jaw and a second opening that slidingly receives a second rod associated with the second jaw, and a first sleeve and a first nut are received on the first rod and a second sleeve and a second nut are received on the second rod, and the piston is located between the first sleeve and the first nut and between the second sleeve and the second nut.

3. The gripper assembly as recited in claim 2 wherein the first rod and the second rod each includes an opening that receives a cam pin to move the first jaw and the second jaw as the first rod and the second rod move.

4. The gripper assembly as recited in claim 2 further including a positioning member that secures at least one of the first sleeve relative to the first rod and the second sleeve relative to the second rod, wherein a portion of the positioning member is biased into a recess in at least one of the first sleeve and the second sleeve to secure at least one of the first sleeve and the second sleeve relative to the first rod and the second rod, respectively.

5. The gripper assembly as recited in claim 2 wherein the first nut is spaced apart from the piston and the second nut is flush with the piston when the piston is in the extended position such that movement of the piston from the extended position to the retracted position first moves the second rod to move the second jaw and then moves the first rod to move the first jaw.

6. The gripper assembly as recited in claim 2 wherein the first sleeve is spaced apart from the piston and the second sleeve is flush with the piston when the gripper piston is in the retracted position such that movement of the piston from the retracted position to the extended position first moves the second rod to move the second jaw and then moves the first rod to move the first jaw.

7. A gripper assembly comprising:

a piston moveable between an extended position and a retracted position; and a first jaw and a second jaw each coupled to the piston for movement over a range of motion, wherein the range of motion of each of the first jaw and the second jaw is independently adjustable from the range of motion of the other of the first jaw and the second jaw, wherein the piston includes a first opening that slidingly receives a first rod associated with the first jaw and a second opening that slidingly receives a second rod associated with the second jaw, and a first sub-piston is secured to the first rod and received in the first opening and a second sub-piston is secured to the second rod and received in the second opening.

8. The gripper assembly as recited in claim 7 further including a bracket including a first cavity and a second cavity that each receive a portion of the first rod and a portion of the second rod, respectively, wherein a first stop is located in the first cavity and a second stop is located in the second cavity, and the second stop is positioned closer to the piston than the first stop.

9. The gripper assembly as recited in claim 8 wherein the first rod and the second rod are spaced apart from the first stop and the second stop, respectively, when the piston is in the retracted position, and when the piston moves from the retracted position to the extended position, the second rod first contacts the second stop to move the second jaw and then the first rod contacts the first stop to move the first jaw.

10. The gripper assembly as recited in claim 8 wherein the first rod and the second rod contact the first stop and the second stop, respectively, when the piston is in the extended position, and when the piston moves from the extended position to the retracted position, the piston first contacts the first sub-piston to first move the first rod and the first jaw and then the piston contacts the second sub-piston to then move the second rod and the second jaw.

11. A gripper assembly comprising:

a piston moveable between an extended position and a retracted position;

a first rod and a second rod each connected to the piston; and a first jaw and a second jaw connected to the first rod and the second rod, respectively, for movement over a range of motion, wherein the range of motion of each of the first jaw and the second jaw is independently adjustable from the range of motion of the other of the first jaw and the second jaw by adjustment of a sliding motion of the first rod and the second rod with respect to the piston, and wherein the first jaw and the second jaw are in an open position when the piston is in the extended position and the first jaw and the second jaw are in a closed position to grip a workpiece when the piston is in the retracted position.

12. The gripper assembly as recited in claim 11 wherein the piston synchronously moves the first jaw and the second jaw near the closed position and asynchronously moves the first jaw and the second jaw near the open position.

13. A method of moving a gripper assembly between an extended position and a retracted position, the method comprising the steps of:

connecting a first rod and a second rod to a piston;

connecting the first rod and the second rod to a first jaw and a second jaw, respectively;

moving a first jaw over a first range of motion by moving the piston;

moving a second jaw over a second range of motion by moving the piston; and independently adjusting the first range of motion from the second range of motion by adjusting a sliding range of travel of the first rod and the second rod with respect to the piston.

14. The method as recited in claim 13 further including the steps of actuating the gripper assembly from the extended position to the retracted position to close the first jaw and the second jaw and actuating the gripper assembly from the retracted position to the extended position to open the first jaw and the second jaw.

15. The method as recited in claim 13 further including the steps of synchronously moving the first rod and the second rod near the retracted position and asynchronously moving the first rod and the second rod near the extended position during movement of the gripper assembly from the extended position to the retracted position.

16. A gripper assembly, comprising:
- a piston moveable between an extended position and a retracted position;
- a first rod and a second rod each connected to the piston;
- a first jaw and a second jaw connected to the first rod and the second rod, respectively, for movement over a range of motion in response to movement of the piston, wherein the range of motion of each of the first jaw and the second jaw is independently adjustable from the range of motion of the other of the first jaw and the second jaw; and
- wherein the first rod and the second rod are slidable with respect to the piston over an adjustable range of travel to provide independent adjustment of the range of motion of the first jaw and the second jaw.

* * * * *